Patented Oct. 11, 1949

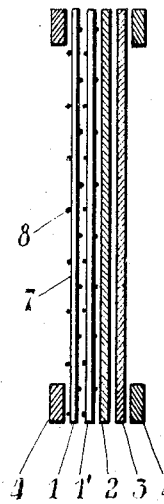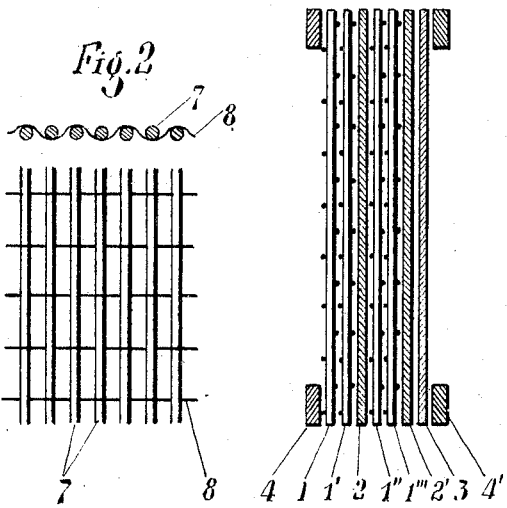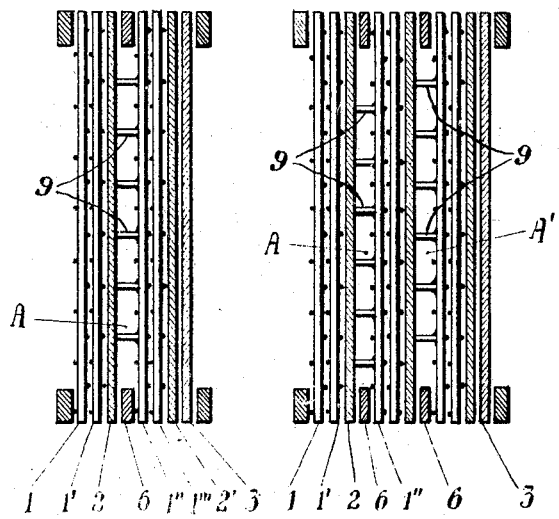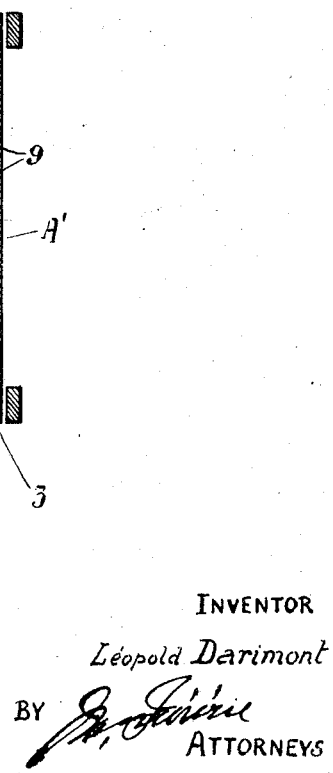

2,484,334

UNITED STATES PATENT OFFICE 2,484,334

COMPOSITE SCREEN FOR CINEMATOGRAPHIC AND OTHER PROJECTIONS

Léopold Darimont, Anderlecht-Brussels, Belgium

Application June 17, 1946, Serial No. 677,209
In Belgium May 6, 1946

6 Claims. (Cl. 88—28.9)

The invention refers to screens for cinematographic and other projections, and intends essentially to provide a screen causing the sensation of stereoscopy (vision in relief and depth) as well as the sensation of aerial perspective, under all angles of vision.

The screen according to the invention includes essentially a bottom surface covered with an even, white textile fabric, such as muslin, on the outer surface of which are fixed or maintained, in any proper manner, elements or threads of round or oval section, in relief on said surface, these elements or threads being arranged vertically and spaced, regularly or not, according to the dimensions of the screen and of the spectator's room, and the said threads being metallized dull (mat), for instance aluminized or silvered over. It has been ascertained by experiments that if a luminous image is projected on a screen of such a design, there results on both sides of the metallized threads in relief an infinity of small centers of diffraction and/or dispersion of light, which causes the impression of extension, in surface and in depth, of the projected image, whereas each eye of the observer perceives at the same time a different quantity of the partial image, i. e., the left eye perceives a larger quantity of the partial image formed on the left sides of the silvered threads in relief, but perceives a smaller quantity (than the right eye) of the partial image formed on the right sides of the metallized threads in relief, these different optical effects merging into each other, joining and combining, to cause the notion of stereoscopy and the sensation of aerial perspective.

The sensation of stereoscopy may be reinforced by increasing the thickness of the threads in relief; it may vary according to their spacing whereas the impression of aerial perspective may be increased by combining with the vertical, metallized threads, horizontal metallized threads of, however, smaller thickness. Practically it is preferable to make use, for the threads in relief, of a canvas with vertical threads thicker than the horizontal ones, and to combine and to superimpose two such canvases the meshes of which are skewed relatively to each other. This combination, indeed, increases the impression of depth and relief. On the other hand, the screen according to the invention may be formed by combined several units as described above i. e. by combining several canvases or systems in relief and several fine fabrics combined with one bottom surface only.

The appended drawing represents:

Figure 1, a section of a simple composite screen;

Figure 2, a front view of a canvas;

Figure 3, a section of a modification of the screen;

Figures 4 and 5, a section of two other modifications.

In Figure 1, the characters of reference 1 and 1' indicate two canvases represented in front view in Figure 2 and consisting both of horizontal threads 8 and thick vertical threads 7, all these threads being metallized, for instance silvered or aluminized, and in dull (mat) condition. Both canvases 1 and 1' are skewed relatively to each other, with regard to mainly the vertical threads. Moreover, both canvases are in relief on a fabric 2, very tight and white, for instance of muslin, applied on a base sheet 3, the whole being kept stretched and tight, for instance between two frames 4 and 4'.

As has been said, it is essential for the invention that vertical metallized and mat (dull) threads 7 be maintained in relief on the surface 2; these threads might, eventually, be maintained only by the frames 4 and 4', instead of being maintained, as in Figure 2, mainly by the horizontal threads 8. In Figure 3, the same base sheet 3 is covered by a double system, there being indeed two canvases 1, 1' in relief on one muslin surface 2, followed up by two other canvases 1", 1''' in relief on a second muslin 2'.

In Figure 4, which corresponds exactly to Figure 3, the elements 6, consisting for instance of frames, separate the muslin 2 from the elements in relief 1" to form in the depth of the screen a compartment A filled with air.

In Figure 5, there are two air spaces A, A', which separate, as in Figure 4, each muslin surface from a layer of metallized elements in relief. The number of spaces A, A' is not limitative.

With the large screens, where spaces A, A' are provided, it may be necessary to provide at the points of intersection of the horizontal and vertical threads canvases small tubes or other spacing elements 9, which would be arranged crosswise to said spaces A, A', in order to keep constant spacing between the canvases and the corresponding muslins over the whole extension of the screen.

Having fully described my said invention, what I claim and desire to secure by Letters Patent, is:

1. A photographic projection screen comprising, a base sheet, a thin white sheet of tightly woven muslin in front of said base sheet, and two sheets of coarsely woven canvas in front of said muslin sheet, said canvases comprising dull metalized threads which are disposed in general vertical and horizontal positions, said canvas sheets being oriented relative to each other so that their threads are angularly offset relative to each other.

2. In a photographic projection screen, a base sheet, a thin white sheet of tightly woven fabric stretched in front of said base sheet, and a plurality of dull metalized threads disposed in spaced relation in front of said fabric sheet, said threads including vertically disposed threads and thinner horizontal threads woven transversely of said vertical threads.

3. In a photographic projection screen, a base sheet and a plurality of reflecting units positioned one in front of another and in front of said base sheet, each of said units comprising a thin white sheet of tightly woven fabric toward the base sheet, and a plurality of dull metalized threads disposed in spaced relation in front of said fabric sheet, said units being predeterminedly spaced apart by spaced horizontally disposed spacing elements aligned with said horizontal threads and carried by the vertical threads of the rearward of said spaced units.

4. A photographic projection screen comprising a base sheet, a thin white sheet of tightly woven muslin in front of said base sheet, and two sheets of coarsely woven canvas in front of said muslin sheet, said canvas comprising dull metalized threads which are generally arranged in vertical and horizontal position, said canvases being turned relatively to each other so that their threads are angularly offset relative to each other.

5. A photographic projection screen comprising a base sheet and a plurality of units in front of said base sheet, each unit including a thin sheet of tightly woven muslin, and two sheets of coarsely woven canvas in front of said muslin sheet, said canvas comprising dull metalized threads which are generally arranged in vertical and horizontal position, said canvases being turned relatively to each other so that their threads are angularly offset relative to each other, said units being superposed on each other with the front face of the front canvas sheet of the rear unit toward the back face of the muslin sheet of the front unit, the group of units being positioned in front of said base sheet with the back sheet of muslin of the rear unit toward the base sheet.

6. A photographic projection screen comprising a base sheet and a plurality of units in front of said base sheet, each unit including a thin sheet of tightly woven muslin, and two sheets of coarsely woven canvas having dull metalized threads which are generally arranged in vertical and horizontal position, said canvas sheets being turned relatively to each other so that their threads are angularly offset relative to each other, said units being superposed in front of each other with the front face of the front canvas sheet of the rear unit toward the back face of the muslin sheet of the front unit, with spacers extending between their surfaces, said units being positioned with the back of the sheet of muslin of the rear unit toward the base sheet.

LÉOPOLD DARIMONT.

REFERENCES CITED

The following references are of record in the file of this patent:

UNITED STATES PATENTS

| Number | Name | Date |
| --- | --- | --- |
| 995,289 | Price | June 13, 1911 |
| 1,202,945 | Wohl | Oct. 31, 1916 |
| 1,349,064 | Heale et al. | Aug. 10, 1920 |
| 1,594,951 | Headding et al. | Aug. 3, 1926 |
| 1,650,341 | Goldstein | Nov. 22, 1927 |
| 1,672,656 | Payne | June 5, 1928 |
| 1,686,880 | Shay | Oct. 9, 1928 |
| 1,917,246 | Faris | July 11, 1933 |
| 2,016,185 | Thomson | Oct. 1, 1935 |

FOREIGN PATENTS

| Number | Country | Date |
| --- | --- | --- |
| 300,000 | Germany | Feb. 12, 1916 |
| 525,750 | Great Britain | Sept. 4, 1940 |